(12) United States Patent
Joh

(10) Patent No.: US 6,256,312 B1
(45) Date of Patent: *Jul. 3, 2001

(54) LOCAL AREA NETWORK

(75) Inventor: Clarence Chulljoon Joh, Allentown, PA (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/835,624

(22) Filed: Apr. 9, 1997

Related U.S. Application Data

(63) Continuation of application No. 08/206,077, filed on Mar. 4, 1994, now abandoned.

(51) Int. Cl.[7] .................................................. H04L 12/46
(52) U.S. Cl. ......................... 370/401; 370/420; 370/502; 709/249
(58) Field of Search .................................... 370/401, 402, 370/403, 419, 420, 463, 282, 285, 362, 445–448, 364, 501, 502, 421; 395/200.79; 364/284.4, 242.94; 709/249, 251, 252, 253

(56) References Cited

U.S. PATENT DOCUMENTS

| | | | |
|---|---|---|---|
| 5,163,048 | * | 11/1992 | Heutink ................................ 370/402 |
| 5,274,631 | * | 12/1993 | Bhardwaj ............................. 370/401 |
| 5,311,114 | * | 5/1994 | Sambamurthy et al. ............ 370/296 |
| 5,345,447 | * | 9/1994 | Noel ..................................... 370/362 |
| 5,379,289 | * | 1/1995 | DeSouza et al. .................... 370/401 |
| 5,387,769 | * | 2/1995 | Kupersmith et al. ............... 370/402 |
| 5,387,905 | * | 2/1995 | Grube et al. ......................... 370/401 |
| 5,390,173 | * | 2/1995 | Spinney et al. ..................... 370/401 |
| 5,421,024 | * | 5/1995 | Faulk, Jr. et al. ................... 370/362 |
| 5,422,878 | * | 6/1995 | Kimoto et al. ...................... 370/401 |
| 5,432,907 | * | 7/1995 | Picazo et al. ........................ 709/249 |
| 5,606,557 | * | 2/1997 | Kuroshita et al. .................. 370/364 |
| 5,682,383 | * | 10/1997 | Dahod et al. ........................ 370/364 |
| 5,802,047 | * | 9/1998 | Kinoshita ............................ 370/359 |
| 5,802,278 | * | 9/1998 | Isfeld et al. ......................... 370/401 |
| 5,818,838 | * | 10/1998 | Backes et al. ....................... 370/432 |
| 5,870,566 | * | 2/1999 | Joh ....................................... 370/452 |

FOREIGN PATENT DOCUMENTS 0 495575   7/1992   (EP) .

OTHER PUBLICATIONS

WO–A–92 21191 (Digital Equipment) p. 6, line 1; p. 7, line 20.
WO–A–91 16679 (Chipcom) p. 20, line 6–24 p. 24, line 7–18.
Data Commuications, vol. 19, No. 10, Aug. 1990 New York, US, pp. 58–65, S.S. King "Multiport Bridges" Figure 1.
ISO/IEC 8802–3 Information Processing Systems Local area Networks.

* cited by examiner

*Primary Examiner*—Seema S. Rao

(57) ABSTRACT

A local area communication system is disclosed. The system includes a plurality of users connected to respective busses. A multiport bridge router recognizes destination addresses and diverts packets from one bus to another. Repeaters for several users may be formed on a single integrated circuit.

3 Claims, 2 Drawing Sheets

LOCAL AREA NETWORK

This application is a continuation of application Ser. No. 08/206,077 filed on Mar. 4, 1994, now abandoned.

TECHNICAL FIELD

This invention relates to local area network communication systems.

BACKGROUND OF THE INVENTION

A variety of designs have been utilized for local area network (LAN) communication systems. One local area network communication system is depicted in FIG. 1. The system depicted in FIG. 1 may be termed a bus based Ethernet LAN broadcast system. User stations 13, 15, 17 and 19 are each connected to bus 11. When, for example, user 13 wishes to communicate, he transmits information to bus 11. The information is potentially available to users 15, 17 and 19. The user having the correct destination address receives and interprets the information. (If the system is equipped with a security feature, other users who have different destination addresses presumably cannot access the information.)

Another popular system is depicted in FIG. 2. Reference numeral 21 denotes a multiple port repeater based Ethernet LAN. The configuration depicted in FIG. 2 is often termed a "star topology." Users 23, 25, 27, 29, 31 and 33 are each connected to a single, multiport repeater 21. Should user 23, for example, wish to transmit information, the information is transmitted to repeater 21. Repeater 21 rectifies various forms of signal degradation which may have occurred during transmission and then broadcasts the information to users 25, 27, 29, 31 and 33. The user having the correct destination address receives and interprets the information, while users with different destination addresses either: (i) receive the information anyway, or (ii) cannot receive the information because a security feature prevents them from receiving it due to their incorrect destination addresses.

Both of the systems depicted in FIGS. 1 and 2 have several shortcomings. Each system is a collision-based system. Thus, when one user, for example, user 23 or user 13, is transmitting information, other users cannot transmit. Should another user attempt to transmit, a collision results and the other user's transmitter backs off and waits for another opportunity to transmit. Thus, only a single user may transmit at any given time period.

In both the systems depicted in FIG. 1 and FIG. 2, a single medium, either bus 11 or multiport repeater 21 is shared by all users.

Each of the systems in FIG. 1 and FIG. 2 is theoretically capable of handling a large number of users, for example, as many as 1,024 users. However, because of the collision problem, as the number of users increases, the effective bandwidth per user decreases. In other words, as the number of users increases, the efficiency of the system in transmitting information decreases.

SUMMARY OF THE INVENTION

The present invention serves to alleviate the above-mentioned problems. The invention illustratively includes a plurality of buses, each bus having a respective plurality of user stations connected to it. Each user station is capable of either sending or receiving packets of information having destination addresses. A multiport bridge router connects the buses. The multiport bridge router is capable of directing information packets from one bus to another one in accordance with the destination address of the packet.

Another embodiment of the invention includes a single bus together with a plurality of addressable user stations, each station having a respective media access controller capable of recognizing packets of information having the respective user station's address. Each user station is connected through its respective controller to the bus. Furthermore, a memory is connected to the bus. Information packets transmitted from a first user station with respective controller are sent to the memory by the bus and subsequently received by a second controller associated with respective second user station.

DETAILED DESCRIPTION

Figure 3:
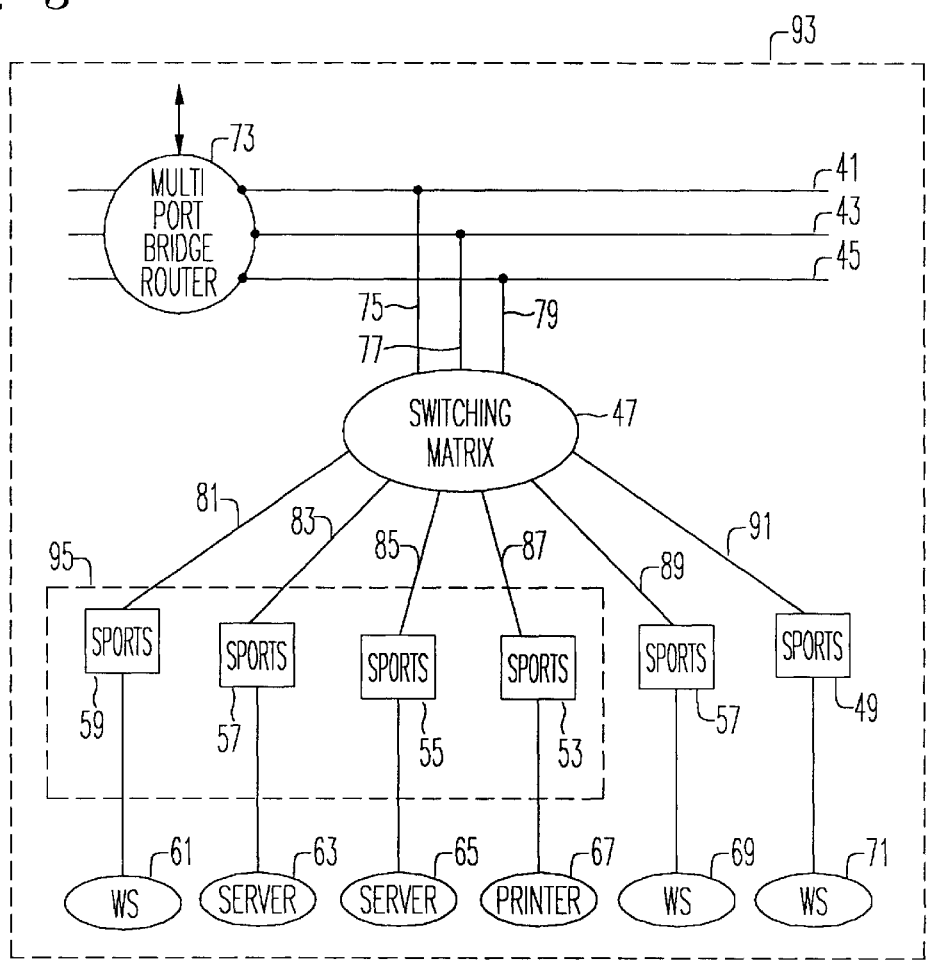
FIGS. 3, and 4 are block diagrams showing illustrative embodiments of the present invention.

An illustrative embodiment of the present invention is depicted in FIG. 3. Reference numerals 41, 43 and 45 depict Ethernet buses.

Switching matrix 47 is connected to bus 41 by connector 75; to bus 43 by connector 77; and to bus 45 by connector 79. Repeaters 49, 51, 53, 55, 57 and 59 are each respectively connected to switching matrix by lines 91, 89, 87, 85, 83 and 81. As can be seen from FIG. 3, individual users, which may, for example, be work stations, servers, printers, etc., designated by reference numeral 61, 63, 65, 67, 69 and 71 are each connected to a respective individual repeater, 59, 57, 55, 53, 51 and 49.

Thus, in the embodiment illustrated in FIG. 3, individual users or desk tops or groups of desk tops, are each connected to an unique Ethernet bus. For example, users 61 and 63 may be connected via repeaters 59 and 57 and lines 81 and 83 via switching matrix 47 and line 75 to bus 41. By contrast, users 65 and 67 may be connected in a similar manner via bus 43; and users 69 and 71 might be connected via bus 45. Users who are connected to the same bus may communicate efficiently in a manner similar to the communication system described in connection with FIG. 1.

Communication between users assigned to different buses is accomplished via multiport bridge router 73. Multiport bridge router 73 is connected to buses 41, 43 and 45. Multiport bridge router 73 examines the destination address of every packet of information transmitted on each bus. Thus, for example, should user 61 transmit a packet of information destined for user 71, multiport bridge router 73 examines the packet placed on bus 41 by user 61 and determines that the destination address is not a destination address assigned to bus 41. Multiport bridge router 73 determines that the destination address belongs to a user assigned to bus 45 and directs the packet to bus 45 where it may be ultimately receive by user 71.

Switching matrix 47 is hard-wired, i.e., it serves to connect multiple users, e.g., 63 to an assigned bus. Matrix 47 does not, however, move packets or signals from one bus to another.

If desired, the entire system depicted in FIG. 3, and designated, in general, by reference numeral 93, may be connected to another similarly configured system via a connection between their respective multiport bridge routers 73.

For convenience, individual repeaters, such as repeaters 53, 55, 57 and 59, may be grouped together on a single chip 95.

Figure 1:
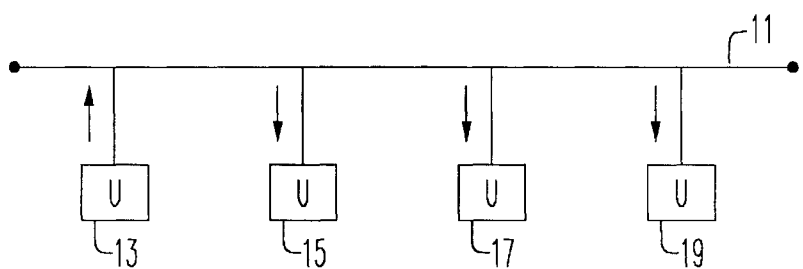
FIGS. 1 and 2 are block diagrams depicting previously-used local area network systems.
Figure 2:
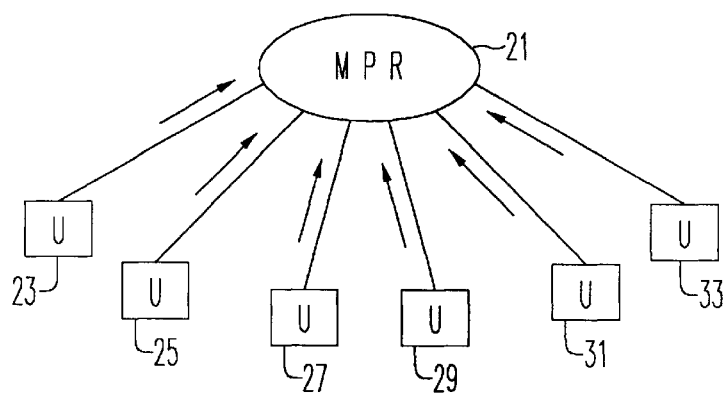

The network architecture of FIG. 3 possesses several advantages over the architectures of FIG. 1 and FIG. 2. For example, the architecture of FIG. 3 provides an increased available network bandwidth per user. The existence of multiple buses 41, 43 and 45 (also termed segments) provides for less user contention and, in the extreme, no contention at all. The presence of several buses (segments) means that there exists multiple collision domains, thereby providing the network with less collisions or, in the extreme, no collisions at all. Furthermore, the bandwidth available to users may be scale, unlike the systems of FIG. 1 and FIG. 2, by adding additional buses 41, 43, 45 (segments). In the extreme, only two users may be assigned to a particular bus or segment, thereby providing a virtually dedicated bandwidth, i.e., essentially a private Ethernet per user.

The present invention also provides for improved network utilization. switching matrix 47 may link individual users, e.g., 61, 63, to whichever buses, e.g., 41, 43, 45, (segments) are least utilized. Thereby network congestion is minimized and peak loads are handled. Switching matrix 47 thereby provides for dynamic network load balancing among segments. Furthermore, by contrast, should a "broadcast storm" erupt on either of the networks depicted in FIG. 1 or FIG. 2, network performance will be substantially impeded.

The system depicted in FIG. 3 has greater fault tolerance because of its redundancy than the system in FIG. 2. Should a single repeater, such as repeater 59, fail, the rest of the network served by repeaters 49, 51, 53, 55 and 57 will function normally. By contrast, if repeater 21 of FIG. 2 fails, the entire network ceases to function. Furthermore, should a particular bus (segment) such as bus 41 fail, switching matrix 47 may reroute traffic to other buses 43 or 45. By contrast, in FIG. 1, should bus 11 fail, the entire network ceases to function.

Figure 4:
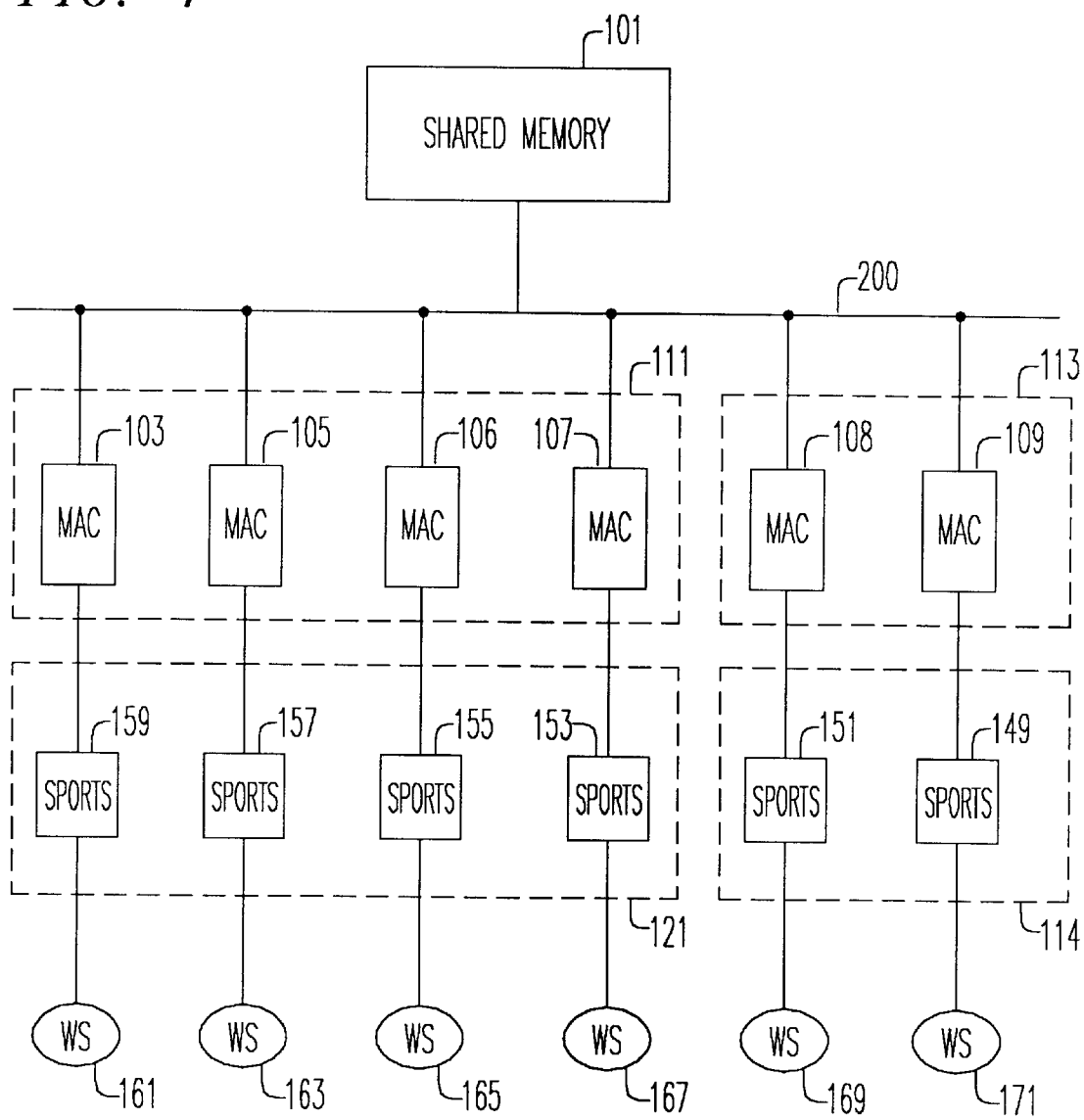

Another embodiment of the present invention is depicted in FIG. 4. In FIG. 4 there is no switching matrix similar to switching matrix 47 of FIG. 3. Furthermore, the system of FIG. 4 has only one bus designated by reference numeral 200 (as opposed to a plurality of buses 41, 43 and 45 depicted in FIG. 3). The system of FIG. 4 does not have a multiport bridge router 73. In FIG. 4, each user station, reference numerals 161, 163, 165, 167, 169 and 171, is connected to high-speed parallel bus 200 through transceiver portions of repeaters 159, 157, 155, 153, 151 and 149, respectively, and media access controllers 103, 105, 106, 107, 108 and 109, respectively. Shared memory 101 is connected to high-speed parallel bus 200. The system of FIG. 4 utilizes packet switching. Consequently, there is no permanent or semipermanent circuit established between communicating users. Each user station transmits a packet of information having source and destination addresses. Each media access controller (MAC) examines the destination address portion of the incoming packet and transmits the packet to shared memory 101. The MACs perform serial to high-speed parallel conversion and vice versa. The packet processor 102 constantly examines memory 101 for packets with the appropriate destination address. Whenever possible, the packet processor retrieves the packet from memory and transmits it the ultimate user station. The MAC associated with the destination station resolves collisions which may occur if two packets come ready simultaneously to the destination and also performs error and parity checking. Thus, switching is accomplished on a per packet basis in FIG. 4 in contrast to the circuit switching arrangement of FIG. 3 in which switching is accomplished on a per port basis.

The system provides greater security than the systems depicted in FIGS. 1 and 2 because only the controller associated with the appropriate destination address may retrieve the packet from shared memory 101. Controllers and repeaters may be combined on a single chip. For example, controllers 103, 105, 106 and 107 may be combined on a single chip 111, whereas repeaters with associated transceivers 159, 157, 155 and 153 may be combined on a single chip 121.

Similarly, controllers 108 and 109 may be combined on a single chip 113, and repeaters 151 and 149 may be combined on a single chip 114. Or, the multiple media access controllers 103, 105, 106 and 107 and the multiple transceivers of repeaters 159, 157, 155 and 153 may be combined on a single chip 131, 133.

What is claimed is:

1. A system comprising:
    a plurality of repeaters, each repeater being associated with a respective single user station, each of said repeaters being assigned to a specific location of a hard-wired switching matrix;
    a plurality of network segments, each network segment being connected to said switching matrix, said switching matrix for connecting two or more of said repeaters to a single network segment, said switching matrix being incapable of transferring packets from one of said network segments to another network segment; and
    a multiport bridge router connecting said plurality of network segments, said multiport bridge router for transferring packets from one of said network segments to another network segment, said multiport bridge router for examining the destination address of each packet transmitted on each segment and determining the destination address of a user station on a network segment.

2. The system of claim 1 wherein two or more of said repeaters are formed on an integrated circuit.

3. An intergrated circuit comprising:
    a plurality of repeaters and transceivers, each of said plurality of repeaters and transceivers for independent operation, said intergrated circuit for operation in at least first and second architectures,
    said first architecture comprising:
        a plurality of user stations, each of said user stations having a respective integrated circuit, each said integrated circuit being connected to a switching matrix, and a plurality of network segments, each network segment being connected to said switching matrix, said switching matrix for linking each of said plurality of repeaters and transceivers from one of said network segments to another one of said network segments;
    said second architecture comprising:
        a plurality of user stations, each said user station being connected to a respective transceiver portion of said integrated circuit,
        a plurality of controllers, each controller connected to a respective transceiver portion,
        a bus, connecting said plurality of controllers, and
        a memory connected to said bus; whereby information packets transmitted from a first user station through its respective transceiver and controller are sent to said memory via said bus and subsequently received by a second controller and passed through its respective transceiver to its respective user station.

* * * * *